(12) United States Patent
Sano et al.

(10) Patent No.: US 8,730,675 B2
(45) Date of Patent: May 20, 2014

(54) ELECTRONIC DEVICE AND METHOD OF RADIATING HEAT FROM ELECTRONIC DEVICE

(75) Inventors: Tatsuya Sano, Tokyo (JP); Tetsuya Okuchi, Tokyo (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 155 days.

(21) Appl. No.: 13/404,546

(22) Filed: Feb. 24, 2012

(65) Prior Publication Data

US 2013/0050953 A1 Feb. 28, 2013

Related U.S. Application Data

(60) Provisional application No. 61/527,438, filed on Aug. 25, 2011.

(51) Int. Cl.
*H05K 7/20* (2006.01)

(52) U.S. Cl.
USPC ...... 361/710; 361/707; 361/719; 165/104.33; 174/252; 174/548; 438/122

(58) Field of Classification Search
USPC ............ 361/679.46–679.54, 688–690, 361/702–722, 728–730, 752, 760, 807, 831
See application file for complete search history.

(56) References Cited

U.S. PATENT DOCUMENTS

| | | | |
|---|---|---|---|
| 7,440,282 B2 * | 10/2008 | Brandenburg et al. | 361/704 |
| 7,623,349 B2 * | 11/2009 | Refai-Ahmed et al. | 361/719 |
| 7,796,395 B2 * | 9/2010 | Kim | 361/721 |
| 2006/0012034 A1 * | 1/2006 | Kadoya et al. | 257/712 |
| 2009/0119913 A1 * | 5/2009 | Mayuzumi et al. | 29/841 |

* cited by examiner

*Primary Examiner* — Courtney Smith
(74) *Attorney, Agent, or Firm* — Oblon, Spivak, McClelland, Maier & Neustadt, L.L.P.

(57) ABSTRACT

An electronic device including a housing including a frame member exposed to an outer surface of the electronic device; a circuit substrate disposed within the housing on which a plurality of electronic components are disposed; and a heat-radiating member provided in contact with or in close proximity to the electronic components disposed on the circuit substrate, and in contact with the frame member.

14 Claims, 11 Drawing Sheets

ELECTRONIC DEVICE AND METHOD OF RADIATING HEAT FROM ELECTRONIC DEVICE

CROSS REFERENCE TO RELATED APPLICATION

The present application claims the benefit of the earlier filing date of U.S. Provisional Patent Application Ser. No. 61/527,438 filed on Aug. 25, 2011, the entire contents of which is incorporated herein by reference.

BACKGROUND OF DISCLOSURE

1. Field of the Disclosure

The present disclosure relates to an electronic device formed by placing a substrate provided with electronic components in a housing and suitable for application to a cellular phone, a PHS (Personal Handyphone System) phone, a PDA (Personal Digital Assistant) device, a digital camera device, a digital video camera device, a portable gaming device, and a notebook personal computer device, for example, and relates to a method of radiating heat from an electronic device. In particular, the present disclosure relates to an electronic device and a method of radiating heat from an electronic device that allows for strong radiation of heat generated from electronic devices housed in a housing to the outside of the housing.

2. Description of Related Art

Japanese Unexamined Patent Application Publication No. 2008-53790 describes a folding cellular phone intended to efficiently radiate heat generated from heat generating elements mounted on a substrate to the outside.

The folding cellular phone is formed by an upper body including a display section, a lower body including a key operation section, and a hinge mechanism that rotatably couples the upper body and the lower body to each other.

The lower body includes a shield case formed by a metal member, an IC card holder that is formed by a metal member and that can receive an IC card for connection, and a control substrate having heat generating elements. The hinge mechanism includes first to third frames formed by a metal member.

In the folding cellular phone, the shield case and the IC card holder of the lower body abut against each other via the first frame of the hinge mechanism, and a power amplifier, which is a main heat generating element of the control substrate, contacts the shield case.

This allows heat generated from the heat generating elements such as the power amplifier mounted on the substrate to be transmitted sequentially through internal components of the cellular phone via a metal member with high heat conductivity and to be radiated from all the internal components made of a metal material.

Figure 10:
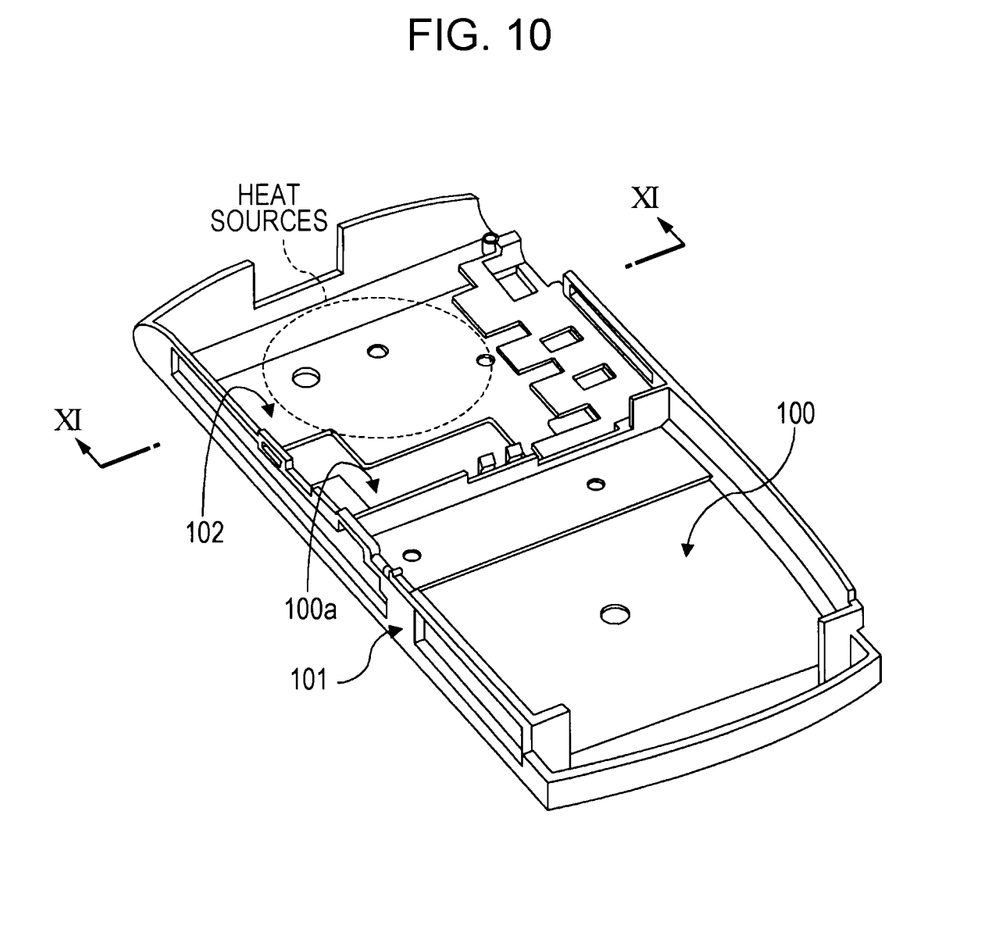
FIG. 10 is a perspective view of a main portion of a cellular phone according to the related art for illustrating the heat radiating structure of the cellular phone according to the related art.

This is also the case with other types of cellular phones. FIG. 10 is a perspective view of a main portion of a cellular phone formed in a generally rectangular plate shape and provided with a large display section.

This cellular phone includes a center panel 100 formed in a rectangular plate shape as shown in FIG. 10. The center panel 100 serves as the framework of the cellular phone, and is formed by a high-strength metal plate such as a stainless steel member and a high-strength resin such as an ABS resin, a polycarbonate resin, or the like, for example.

Electronic components such as a central processing unit (CPU), a memory, a communication circuit (such as an RF module), a power amplifier, a speaker section, a camera section, and a display section are provided on the center panel 100, either directly or via a circuit substrate.

The outer peripheral portion along the four sides of the center panel 100 is fixed to an outer frame member 101 formed by a high-strength resin such as an ABS resin, a polycarbonate resin, or the like, for example. The upper housing and the lower housing are fixed to the outer frame member 101 so as to sandwich the outer frame member 101 vertically. This allows the center panel 100 to be housed in the housing of the cellular phone while being surrounded by the outer frame member 101.

In the cellular phone, electronic components serving as heat sources such as a CPU and a power amplifier, for example, are provided in the vicinity of the upper end portion indicated by a dotted circle in FIG. 10, for example. Therefore, a portion of the center panel 100 in the vicinity of the upper end portion is formed by providing a high-strength metal plate such as a stainless steel member 100a, for example, and applying a high-heat conductivity member such as a copper plate 102 onto the stainless steel member 100a.

In the cellular phone, heat generated from the electronic components serving as heat sources is absorbed and diffused by the high-heat conductivity member such as the copper plate 102.

SUMMARY

However, the folding cellular phone described in Japanese Unexamined Patent Application Publication No. 2008-53790 is configured to radiate heat generated from the heat generating elements such as the power amplifier through transmission through the internal components of the cellular phone. Therefore, the heat radiated via the internal components of the cellular phone may be trapped (accumulated) inside the housing of the cellular phone.

Figure 11:
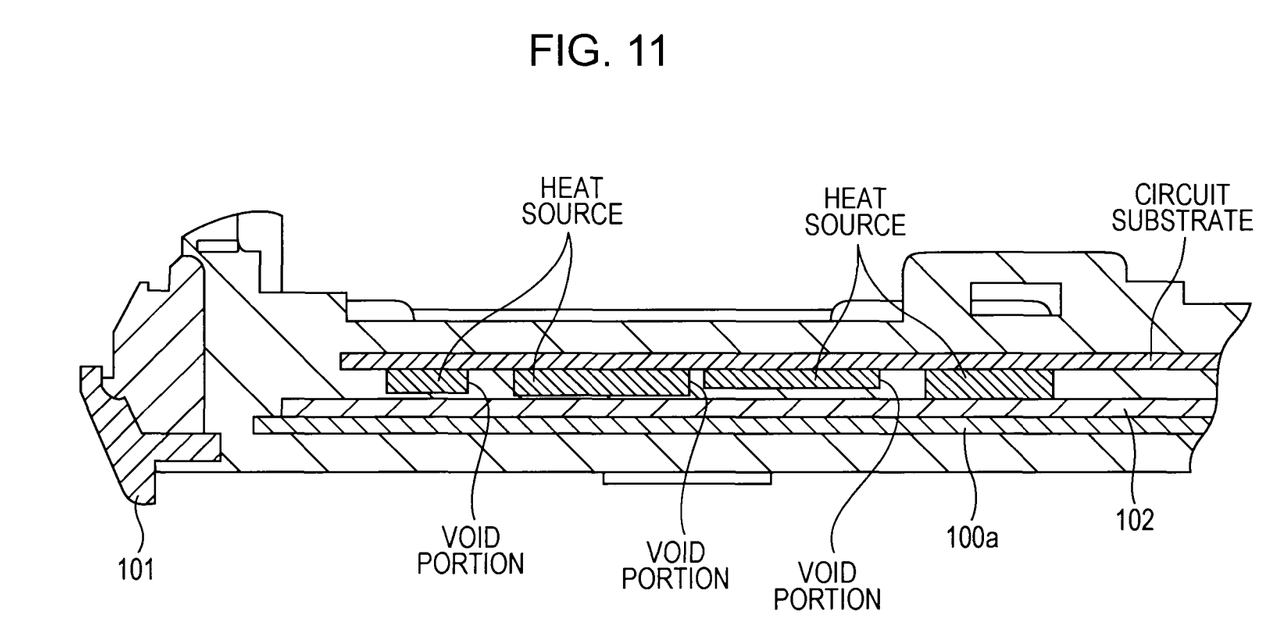
FIG. 11 is a cross-sectional view of a main portion of the cellular phone according to the related art for illustrating a problem that heat generated from heat sources is trapped in the cellular phone according to the related art.

In the cellular phone shown in FIG. 10, likewise, heat may be trapped inside the housing. FIG. 11 is a cross-sectional view of the cellular phone taken along the line A-A shown in FIG. 10, in which a part of the cross-sectional surface is seen from the side of the cross-sectional surface.

The electronic components serving as heat sources such as a CPU and a power amplifier provided on the circuit substrate are different in shape, size, height, etc., from each other. Therefore, when the circuit substrate provided with the electronic components is provided to the center panel 100, void portions of various shapes and sizes are formed between the electronic components and the copper plate 102 provided on the stainless steel member 100a, between the circuit substrate and the copper plate 102, and so forth as shown in FIG. 11.

In the cellular phone shown in FIG. 10, the center panel 100 is surrounded by a resin member (i.e., outer frame member 101) made of an ABS resin, a polycarbonate resin, or the like. Therefore, heat generated from the electronic components or heat radiated from the copper plate 102 may not be easily discharged to the outside of the housing of the cellular phone, and may be trapped (accumulated) in the void portions.

Electronic devices such as a cellular phone in recent years have a smaller housing, and generate a greater amount of heat as a result of being provided with more electronic components to implement more functions. Therefore, it is desirable to immediately develop an electronic device capable of effectively radiating heat generated from electronic components or the like to the outside of a housing.

According to a first exemplary embodiment, the disclosure is directed to an electronic device including a housing including a frame member exposed to an outer surface of the electronic device; a circuit substrate disposed within the housing on which a plurality of electronic components are disposed; and a heat-radiating member provided in contact with or in close proximity to the electronic components disposed on the circuit substrate, and in contact with the frame member.

According to another exemplary embodiment, the disclosure is directed to a method of radiating heat from an electronic device. The method comprising disposing a heat-radiating member in contact, or in close proximity, to electronic components on a circuit substrate disposed within a housing of the electronic device, and in contact with a frame member of the housing exposed to an outer surface of the electronic device.

According to an embodiment of the present disclosure, the heat radiating function of the electronic device can be drastically improved.

DETAILED DESCRIPTION

The present disclosure is applicable to a cellular phone, for example.

[Configuration of Main Portion of Cellular Phone]

Figure 1:
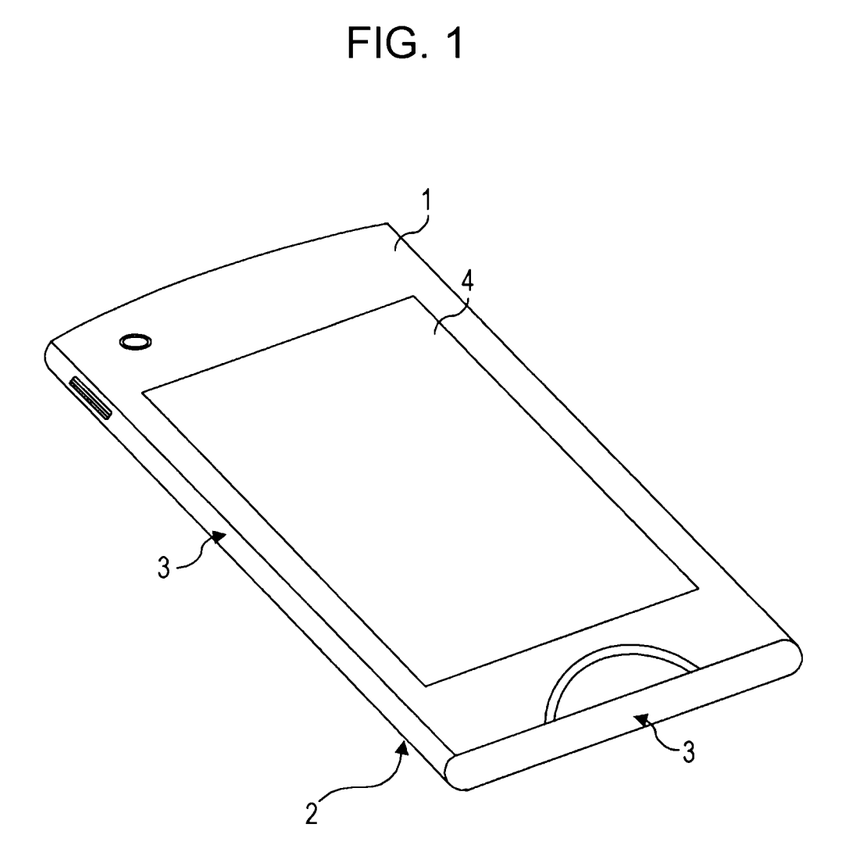
FIG. 1 is a perspective view showing the appearance of a cellular phone according to an embodiment of the present disclosure.

A cellular phone according to an embodiment of the present disclosure is formed by causing an upper housing 1 and a lower housing 2 formed in a generally rectangular box shape as shown in FIG. 1 to abut against each other via an outer frame member 3 extending along the periphery of the cellular phone.

The outer frame member 3 is formed by a metal member such as aluminum, for example, which is a high-conductivity member having high strength and high heat conductivity.

The upper housing 1 is provided with a display section 4 formed in a generally rectangular shape and having a size generally corresponding to the overall surface of the upper housing 1. The display section 4 serves as a so-called touch panel, and is exposed at all times. An operator operates a desired application program or the like through contact via the display section 4.

Figure 2:
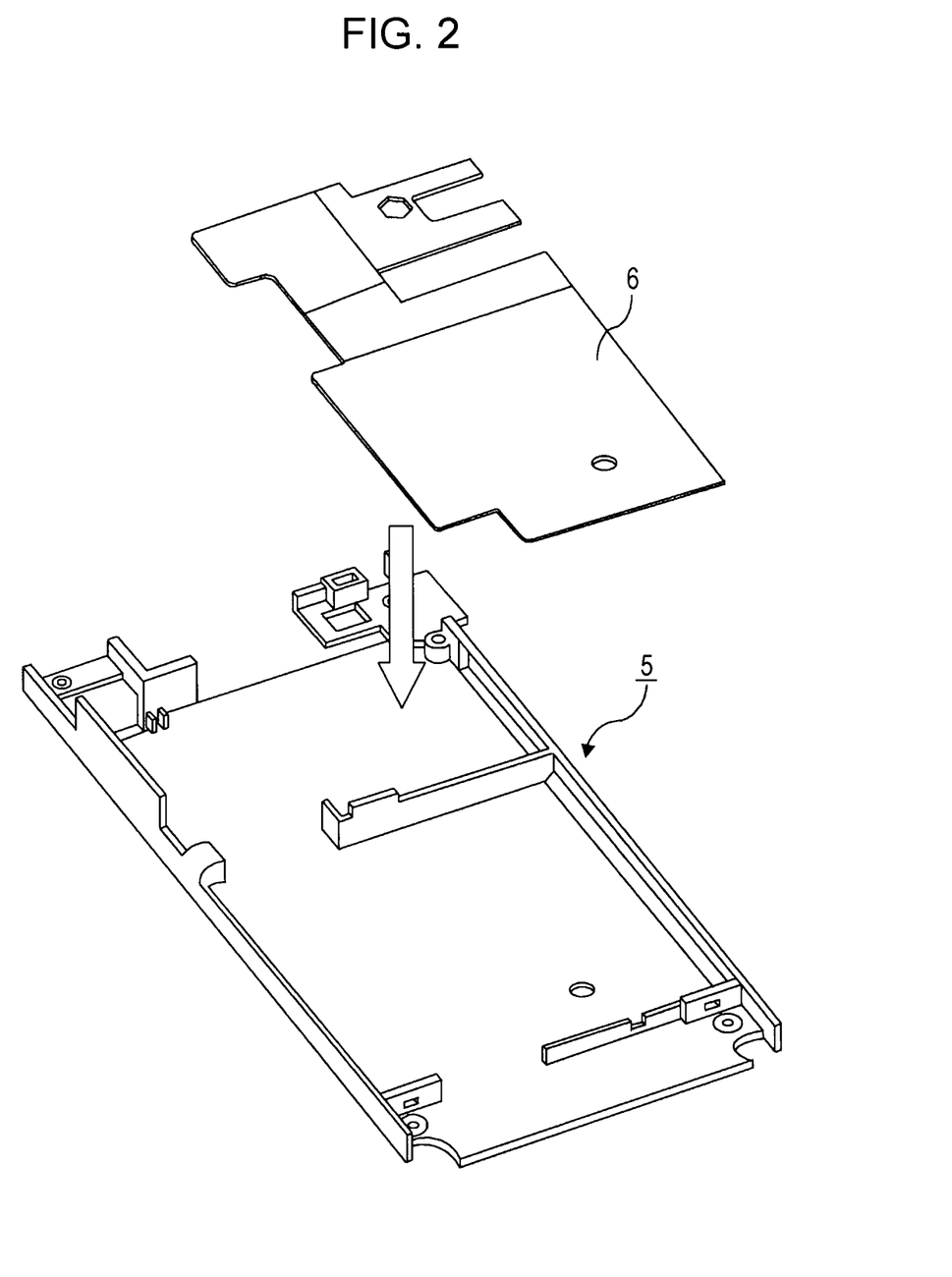
FIG. 2 is an exploded perspective view of a center panel provided in a housing of the cellular phone according to the embodiment.

In the cellular phone, a center panel 5 shown in FIG. 2 is housed in a void portion formed between the upper housing 1 and the lower housing 2 abutting against each other. The center panel 5 serves as the framework of the cellular phone, and is formed by two types of members, namely a high-strength metal plate such as a stainless steel member and a high-strength resin such as an ABS resin, a polycarbonate resin, or the like, for example.

By forming the center panel 5 by two types of members, namely a metal member and a resin member, the weight of the center panel 5 can be reduced while securing the strength of the center panel 5.

Figure 3:
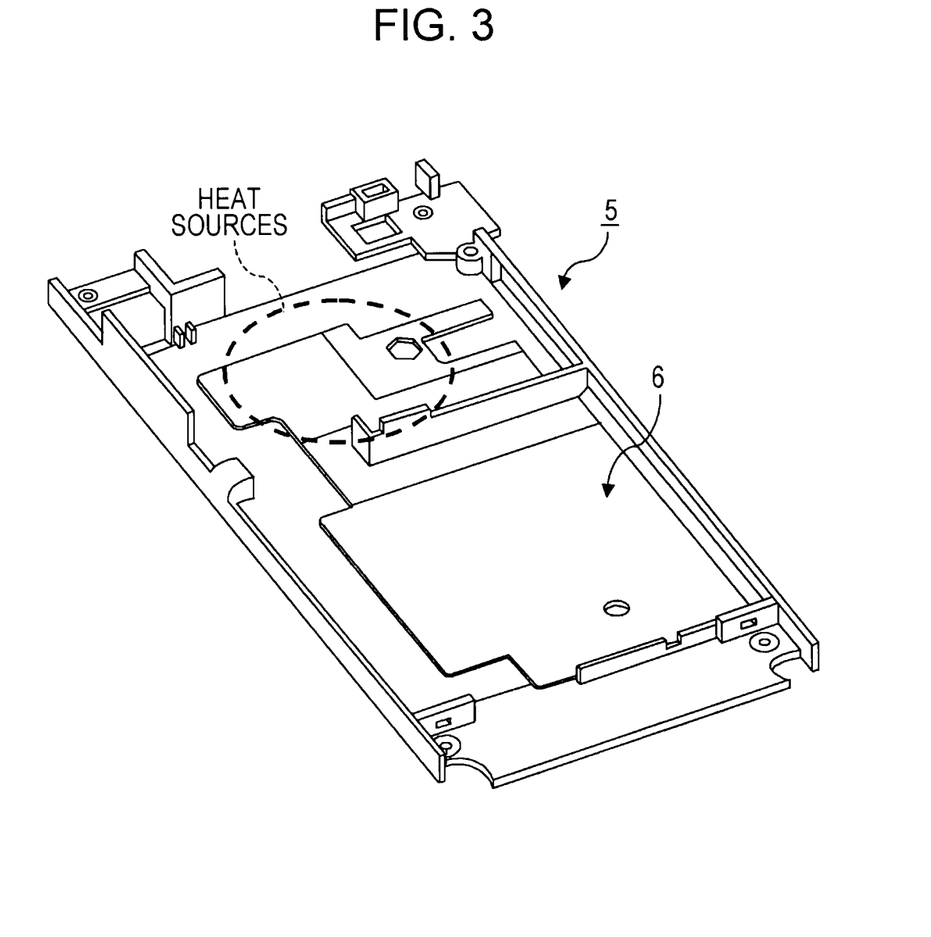
FIG. 3 is a perspective view of the center panel provided in the housing of the cellular phone according to the embodiment.

As shown in FIG. 3, a heat radiating plate 6 formed by a high-conductivity member with high heat conductivity such as a copper plate or a silver plate, for example, is applied to a portion of the center panel 5 formed by the stainless steel member.

Electronic components that serve as "heat sources" such as a central processing unit (CPU), a memory, a communication circuit (such as an RF module), a power amplifier, a speaker section, a camera section, and the display section 4 are provided on the center panel 5, either directly or via a circuit substrate.

In the cellular phone shown in the example, in particular, electronic components that generate much heat such as the central processing unit (CPU), the communication circuit (such as an RF module), and the power amplifier are provided on a portion of the heat radiating plate 6 positioned in the vicinity of the upper end portion of the center panel 5 indicated by a dotted circle in FIG. 3.

Figure 4:
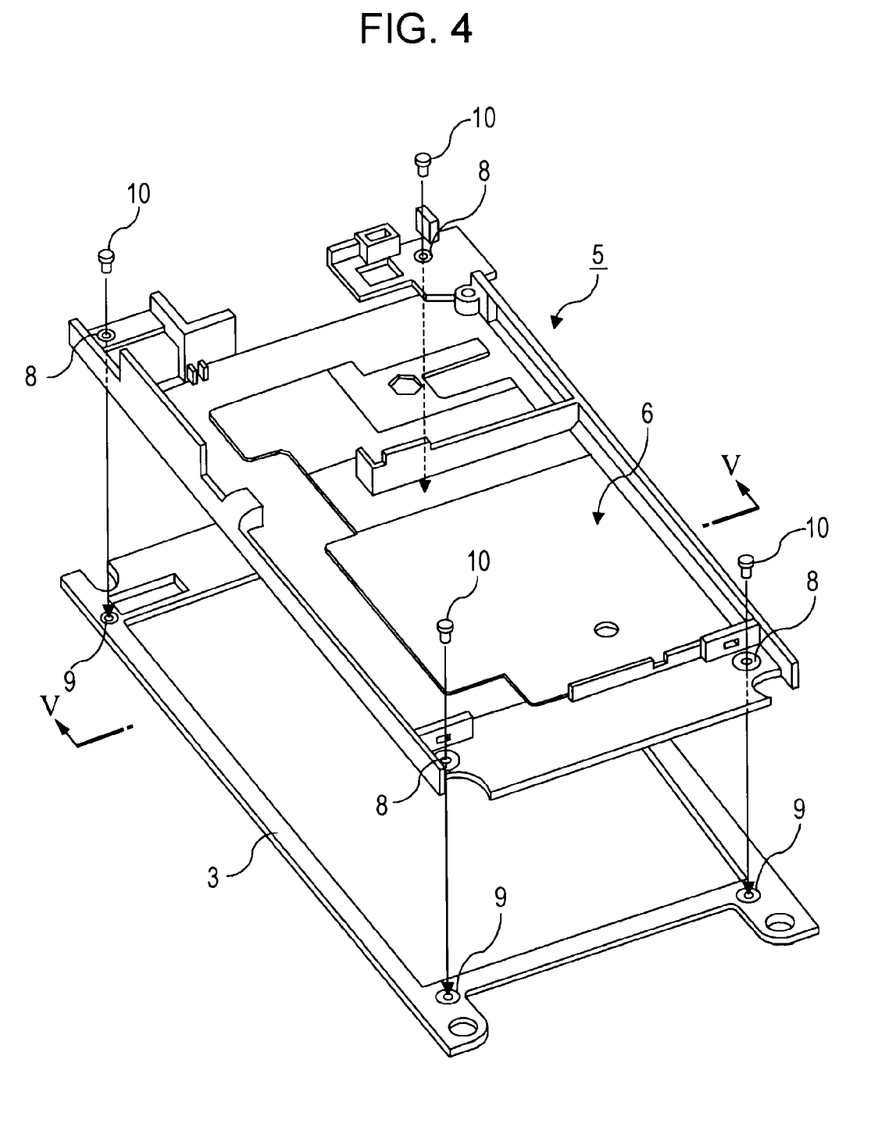
FIG. 4 is a perspective view of an outer frame member of the cellular phone according to the embodiment and the center panel fixed to the outer frame member.

As shown in FIG. 4, screw holes 8 are provided at the four corners or the like of the center panel 5 so as to correspond to screw holes 9 provided at the four corners or the like of the outer frame member 3. The outer frame member 3 is provided to surround the outer periphery of the center panel 5. The center panel 5 is screwed to the outer frame member 3 by screws 10 via the screw holes 8 of the center panel 5 and the screw hole 5 of the outer frame member 3.

[Heat Radiating Structure of Cellular Phone]

Figure 5:
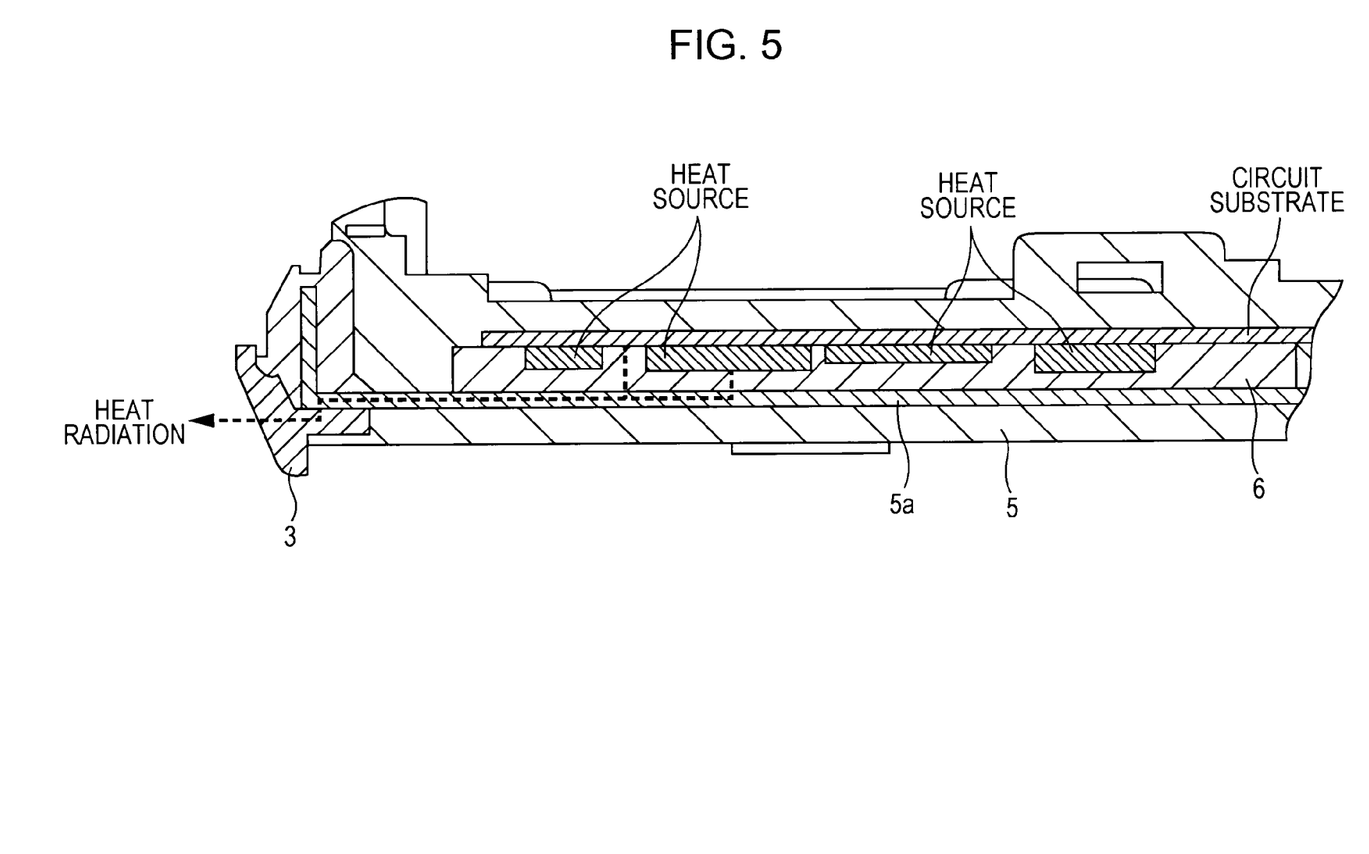
FIG. 5 is a cross-sectional view of a main portion of the cellular phone according to the embodiment.

FIG. 5 shows a cross section of the outer frame member 3 and the center panel 5 attached to the outer frame member 3 taken along the line A-A of FIG. 4, showing a portion of the cross section provided with electronic components serving as "heat sources".

In the cellular phone according to the embodiment, as shown in FIG. 5, a portion of the center panel 5 provided with electronic components serving as "heat sources" is formed by a stainless steel plate 5a, which is a high-strength metal plate. As shown in FIG. 5, the outer peripheral portion along the four sides of the stainless steel plate 5a of the center panel 5 physically contacts the outer frame member 3, which is provided to surround the outer periphery of the center panel 5.

The heat radiating plate 6, which is formed by a high-conductivity member with high heat conductivity such as a copper plate or a silver plate as discussed above, is applied onto the stainless steel plate 5a of the center panel 5. The heat radiating plate 6 include void reducing portions 11 having shapes and volumes respectively corresponding to the shapes and sizes of void portions formed between the circuit substrate and the heat radiating plate 6 and between the electronic components serving as heat sources provided on the circuit substrate and the heat radiating plate 6 as shown in FIG. 5.

When the heat radiating plate 6 is provided to face the circuit substrate, the void reducing portions 11 are fitted with the void portions formed between the electronic components and the heat radiating plate 6 and between the circuit substrate and the heat radiating plate 6 to reduce the void portions formed between the electronic components and the heat radiating plate 6 and between the circuit substrate and the heat radiating plate 6.

Figure 6A:
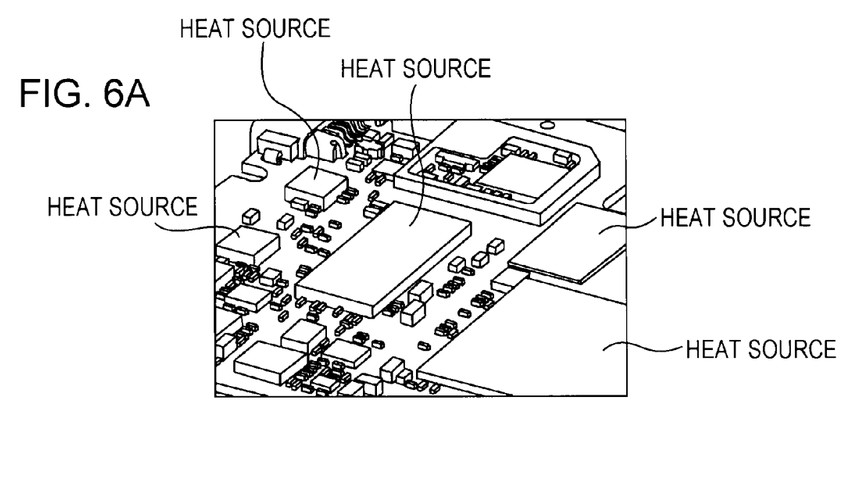
FIG. 6 illustrates a process for forming projections and recesses on a heat radiating plate of the cellular phone according to the embodiment.

This structure will be described in detail again. As shown in FIG. 6(*a*), electronic components (heat sources) provided on the circuit substrate are different in installation area and height from each other. Therefore, if the heat radiating plate 6 were a copper plate with a uniform height (thickness), void portions of various sizes would be formed between the copper plate and the circuit substrate and between the copper plate and the electronic components. Heat radiated from the electronic components might be accumulated in the void portions.

Figure 6B:
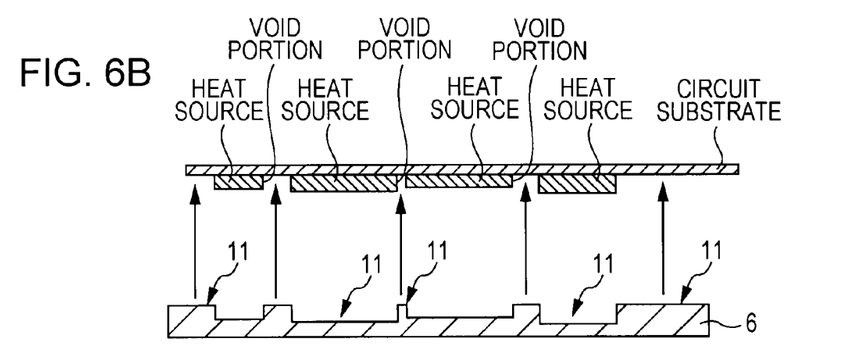

Therefore, in the electronic device according to the embodiment, as shown in FIG. 6(*b*), the heat radiating plate 6 is processed to include the void reducing portions 11 having shapes and volumes respectively corresponding to the shapes and sizes of the void portions formed between the electronic components and the heat radiating plate 6 and between the circuit substrate and the heat radiating plate 6 when the heat radiating plate 6 is provided to face the circuit substrate.

In other words, a surface portion of the heat radiating plate 6 that faces the circuit substrate is processed to include projections and recesses so as to conform to projections and recesses formed by the electronic components on the circuit substrate.

In order to form such void reducing portions 11, in the case where the heat radiating plate 6 is a copper plate of a uniform thickness, for example, a masking process is performed on portions of the copper plate that are not desired to be melted, and the copper plate is then immersed in a solvent. Consequently, portions of the copper plate other than the portions on which the masking process was performed are melted to form projections and recesses on the heat radiating plate 6. A chipping process is further performed on the heat radiating plate, on which the projections and the recesses are formed, in accordance with the height of the electronic components or the like to adjust the height of the projections and the depth of the depressions.

Figure 6C:
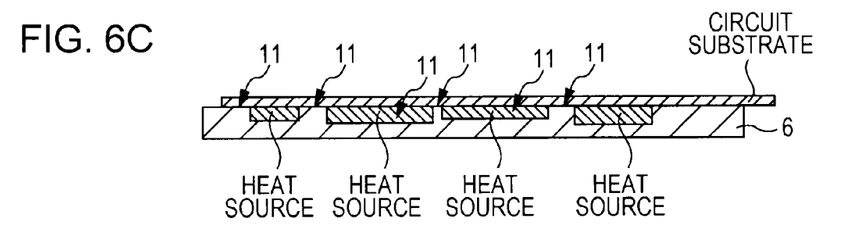

When the circuit substrate and the heat radiating plate 6 are provided to face each other, such void reducing portions 11 are fitted with the void portions formed between the circuit substrate and the heat radiating plate 6 and between the electronic components serving as heat sources provided on the circuit substrate and the heat radiating plate 6 as shown in FIG. 6(*c*) to reduce the void portions.

The height and depth of the void reducing portions 11 of the heat radiating plate 6 may be adjusted such that the void reducing portions 11 and the circuit substrate contact each other and the void reducing portions 11 and the electronic components contact each other. Also, the height and depth of the void reducing portions 11 of the heat radiating plate 6 may be adjusted such that the void reducing portions 11 become close to the circuit substrate contact and the void reducing portions 11 become close to the electronic components.

In the case where the height and depth of the void reducing portions 11 of the heat radiating plate 6 are adjusted such that the void reducing portions 11 and the circuit substrate contact each other and the void reducing portions 11 and the electronic components contact each other, the void portions between the heat radiating plate 6 and the circuit substrate and the void portions between the heat radiating plate 6 and the electronic components can be generally eliminated.

Meanwhile, in the case where the height and depth of the void reducing portions 11 of the heat radiating plate 6 are adjusted such that the void reducing portions 11 become close to the circuit substrate contact and the void reducing portions 11 become close to the electronic components, the void portions between the heat radiating plate 6 and the circuit substrate and the void portions between the heat radiating plate 6 and the electronic components can be made as small as possible.

[Heat Radiating Function of Cellular Phone]

In the thus configured cellular phone according to the embodiment, when the circuit substrate provided with the electronic components is provided to the center panel 5, the void reducing portions 11 of the heat radiating plate 6 applied to the stainless steel plate 5*a* of the center panel 5 are fitted with the void portions between the heat radiating plate 6 and the circuit substrate and the void portions between the heat radiating plate 6 and the electronic components as shown in FIGS. 6(*b*) and 6(*c*). This allows the void portions between the heat radiating plate 6 and the circuit substrate and the void portions between the heat radiating plate 6 and the electronic components to be occupied by the void reducing portions 11 of the heat radiating plate 6.

The void reducing portions 11 of the heat radiating plate 6 absorb heat radiated from the electronic components serving as heat sources and heat that is to be accumulated in the void portions after being radiated from the electronic components. As discussed above, the void reducing portions 11 have shapes and volumes matching the void portions. Therefore, the void reducing portions 11 effectively absorb heat radiated from the electronic components and heat that is to be accumulated in the void portions after being radiated from the electronic components.

The heat radiating plate 6 is applied to the stainless steel plate 5*a* of the center panel 5. Therefore, part of the heat absorbed by the heat radiating plate 6 is diffused through the heat radiating plate 6, and other of the heat is transmitted to the stainless steel plate 5*a*.

As shown in FIG. 5, the stainless steel plate 5*a* is processed to abut against (contact) the outer frame member 3 of the cellular phone made of aluminum. Therefore, the heat transmitted to the stainless steel plate 5*a* is transmitted to the outer frame member 3 via the stainless steel plate 5*a* to be radiated to the outside of the cellular phone via the outer frame member 3 as indicated by the thick arrow in FIG. 5.

The heat radiating function of the thus configured cellular phone according to the embodiment can be summarized as follows.

1. The heat radiating plate 6 includes the void reducing portions 11 fitted with the void portions between the heat radiating plate 6 and the circuit substrate and the void portions between the heat radiating plate 6 and the electronic components. The void reducing portions 11 have shapes and volumes corresponding to the void portions.

Therefore, the heat radiating plate 6 with an increased volume can absorb an increased amount of heat, and can effectively absorb heat that is to be accumulated in the void portions.

2. The heat radiating plate 6 is physically connected to the outer frame member 3 of the cellular phone via the stainless steel plate 5*a* of the center panel 5. Therefore, heat absorbed by the heat radiating plate 6 can be radiated to the outside of the cellular phone sequentially via the stainless steel plate 5*a* of the center panel 5 and the outer frame member 3 of the cellular phone. This prevents heat generated from the electronic components from being trapped in the cellular phone.

[Difference in Heat Radiating Effect Due to Differences in Plate Thickness and Area]

The applicant of the present disclosure conducted an experiment to verify the difference in heat radiating effect due to different plate thicknesses and areas among heat radiating plates.

Figure 7A:
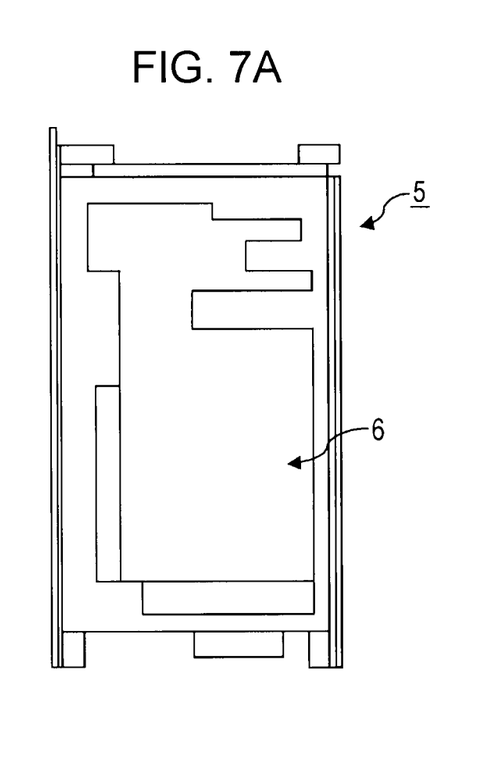
FIG. 7 shows schematic diagrams of various types of heat radiating plates for illustrating the difference in heat radiating effect due to differences in thickness and area among the heat radiating plates.
Figure 7B:
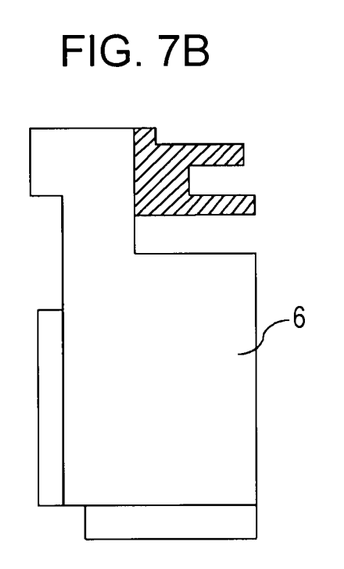
Figure 7C:
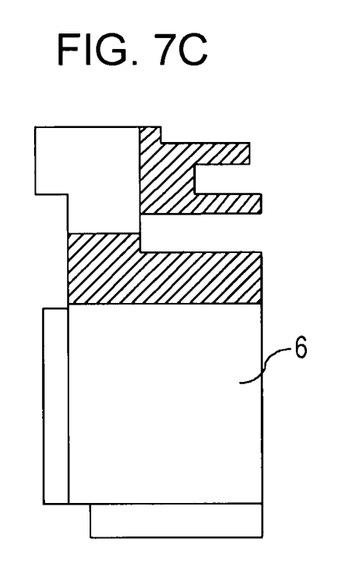

FIG. 7(a) shows a first heat radiating plate formed by a copper plate wholly having a uniform thickness of 0.1 mm. FIG. 7(b) shows a second heat radiating plate formed by a copper plate having a thickness of 0.2 mm at a portion in the vicinity of the upper end portion of the cellular phone indicated by oblique lines, and having a thickness of 0.1 mm at the other portion. FIG. 7(c) shows a third heat radiating plate formed by a copper plate in which the area of a portion having a thickness of 0.2 mm indicated by oblique lines is increased compared to the second heat radiating plate shown in FIG. 7(b).

Figure 8A:
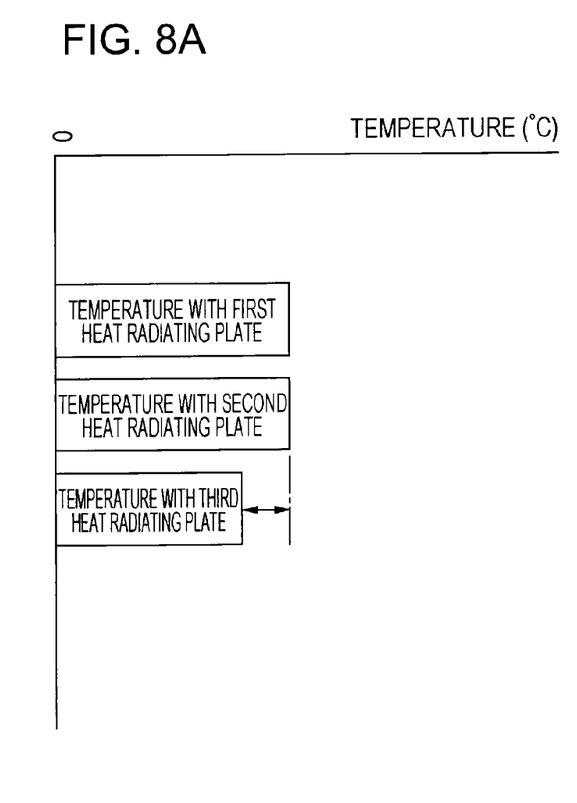
FIG. 8 illustrates the difference in heat radiating effect due to differences in thickness and area among the heat radiating plates.
Figure 8B:
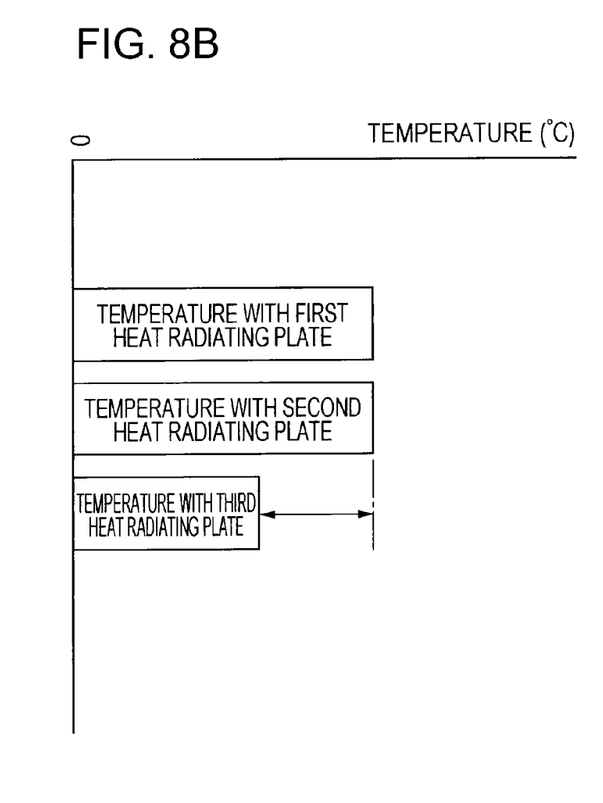

FIG. 8 shows the temperatures on the front and back surfaces of the cellular phone according to the embodiment discussed above measured with each of the first and third heat radiating plates provided to the cellular phone.

As seen from FIG. 8, if the first heat radiating plate wholly having a uniform thickness of 0.1 mm as shown in FIG. 7(a) was changed with the second heat radiating plate partially having a thickness of 0.2 mm as shown in FIG. 7(b), the heat radiating effect for the temperatures on the front and back surfaces of the cellular phone was not improved.

However, in the case where the third heat radiating plate shown in FIG. 7(c), in which the area of the portion having a thickness of 0.2 mm is larger than that in the second heat radiating plate shown in FIG. 7(b) was used, the heat radiating effect for the temperatures on the front and back surfaces of the cellular phone was significantly improved.

From the experiment results, it is seen that it is difficult to achieve a significant heat radiating effect by slightly increasing the size of the heat radiating plate. It is seen that in order to achieve a significant heat radiating effect, it is necessary to provide a large heat radiating plate by making the most of the space.

In the cellular phone according to the embodiment, the heat radiating plate 6 is provided with the void reducing portions 11 shaped and sized so as to be fitted with the void portions between the heat radiating plate 6 and the circuit substrate and the void portions between the heat radiating plate 6 and the electronic components.

Therefore, the heat radiating plate 6 which is large enough to make the most of the space in the void portions can be used to achieve a significant heat radiating effect.

EFFECT OF EMBODIMENT

As is apparent from the above description, the cellular phone according to the embodiment includes the heat radiating plate 6 including the void reducing portions 11 fitted with the void portions between the heat radiating plate 6 and the circuit substrate and the void portions between the heat radiating plate 6 and the electronic components.

The void reducing portions 11 of the heat radiating plate 6 have shapes and volumes corresponding to the void portions, and therefore can occupy the void portions. Therefore, the void reducing portions 11 contact the electronic components serving as heat sources to directly absorb heat generated from the electronic components and to effectively absorb heat that is to be accumulated in the void portions.

Thus, it is possible to prevent heat generated from the electronic components from being accumulated in the void portions to raise the temperature of the housing of the cellular phone.

The heat radiating plate 6 is physically connected to the outer frame member 3 of the cellular phone via the stainless steel plate 5a of the center panel 5. Therefore, heat absorbed by the heat radiating plate 6 can be radiated to the outside of the cellular phone sequentially via the stainless steel plate 5a of the center panel 5 and the outer frame member 3 of the cellular phone. Therefore, it is possible to prevent heat generated from the electronic components from being trapped in the void portions to raise the temperature of the housing of the cellular phone.

In the cellular phone according to the embodiment, heat generated from the electronic components can be effectively radiated. Therefore, it is possible to provide a cellular phone with a drastically improved heat radiating function.

The heat radiating plate 6, which is formed by a copper plate, is applied onto the stainless steel plate 5a to form the center panel 5. As discussed above, the center panel 5 serves as the framework of the cellular phone. Therefore, the use of the stainless steel plate 5a secures enough strength for the framework of the cellular phone. The heat radiating plate 6, which is formed by a copper plate, is a member that can be easily processed to form the void reducing portions 11, and that provides a high heat absorbing effect.

Therefore, the application of the heat radiating plate 6, which is formed by a copper plate, onto the stainless steel plate 5a can form the center panel 5 which can be easily processed to form the void reducing portions 11, which has a high heat absorbing effect, and which has a strength enough for the framework of the cellular phone.

Heat radiating fins formed by providing a copper plate with a plurality of groove portions in a bellows shape are known. The plurality of groove portions can increase the surface area of the heat radiating fins to improve the heat radiating effect.

In such a heat diffusion structure according to the related art, heat radiated from the heat radiating fins is invariably accumulated in the void portions discussed above.

In the cellular phone according to the embodiment, unlike the heat radiating fins, it is not intended to improve the heat radiating effect by increasing the surface area of the heat radiating plate 6, but it is intended to improve the heat radiating effect by efficiently absorbing heat by providing the heat radiating plate 6 with the void reducing portions 11 having shapes and volumes corresponding to the void portions discussed above to reduce the void portions. Thus, it is to be understood that the heat radiating plate 6 provided to the cellular phone according to the embodiment and the heat radiating fins known in the art are totally different from each other.

MODIFICATIONS

In the embodiment discussed above, the heat radiating plate 6, which is formed by a copper plate, is applied onto the stainless steel plate 5a to form the center panel 5. Instead of providing the heat radiating plate 6, which is formed by a copper plate, the stainless steel plate 5a itself may be processed to include void reducing portions having sizes and volumes corresponding to the void portions discussed above.

In this case, heat from the heat sources is absorbed by the void reducing portions of the stainless steel plate 5a, and the absorbed heat is radiated to the outside of the cellular phone sequentially via the stainless steel plate 5a and the outer frame member 3 of the cellular phone, achieving the same effect as the embodiment discussed above.

The center panel 5 may be formed by a copper plate, in place of the stainless steel plate 5a, and a resin having the strength described above, and the copper plate may be provided with void reducing portions having sizes and volumes corresponding to the void portions discussed above.

In this case, heat from the heat sources is absorbed by the void reducing portions of the copper plate, which is provided in place of the stainless steel plate 5a, and the absorbed heat is radiated to the outside of the cellular phone sequentially via the copper plate and the outer frame member 3 of the cellular phone.

In the case where the center panel 5 is formed by a copper plate, in place of the stainless steel plate 5a, and a resin having the strength described above, the heat radiating plate 6 can be dispensed with. This makes it possible to simplify the assembly process and reduce the manufacturing cost by reducing the number of components, besides achieving the same effect as discussed above.

Figure 9:
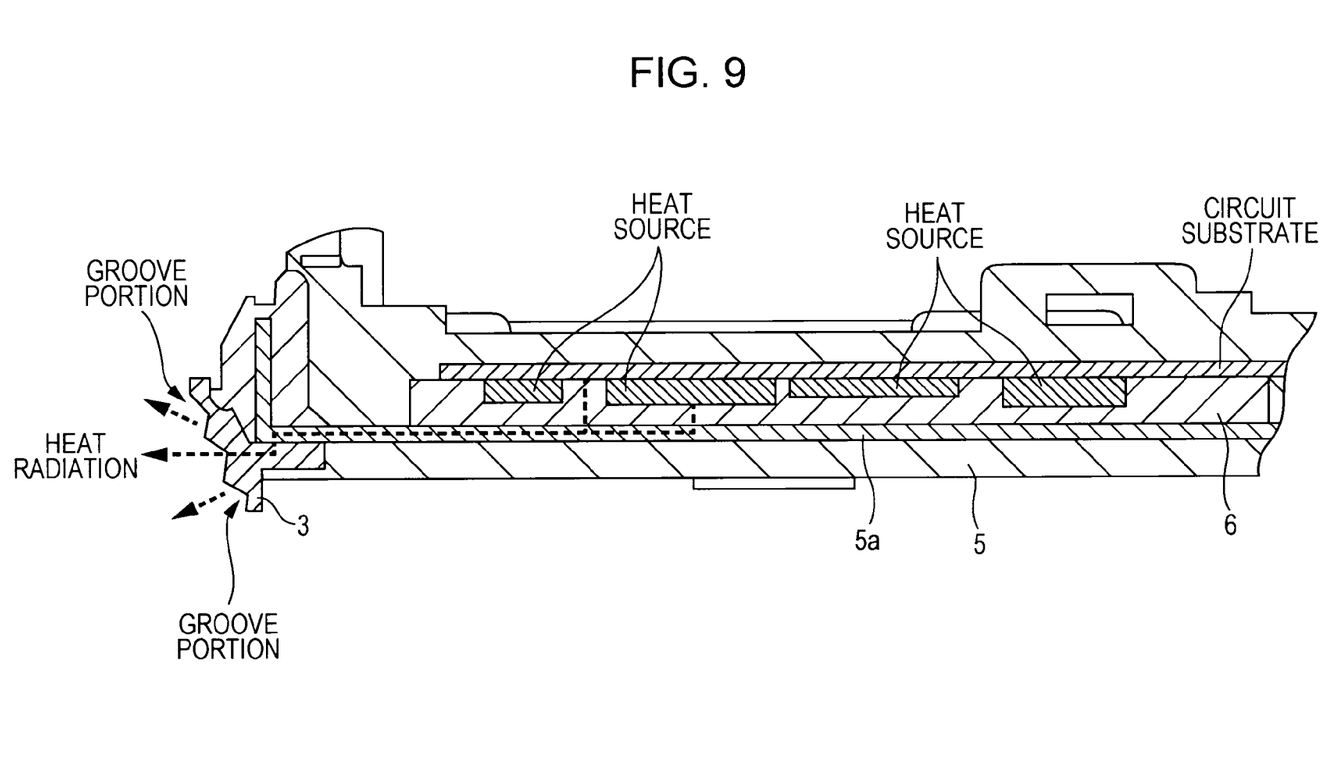
FIG. 9 illustrates a modification of the cellular phone according to the embodiment.

In the cellular phone according to the embodiment discussed above, the outer frame member 3, which is formed by a metal member such as an aluminum member, may be provided with one or a plurality of groove portions as shown in FIG. 9. The groove portions may be provided along the outer periphery of the outer frame member 3, or may be provided along the direction orthogonal to the outer periphery of the outer frame member 3.

By providing the outer frame member 3 with such groove portions, the surface area of a portion of the outer frame member 3 exposed to the outside of the housing of the cellular phone can be increased. Therefore, heat transmitted via the heat radiating plate 6 and the stainless steel plate 5a of the center panel 5 can be more effectively radiated to the outside of the cellular phone, besides achieving the same effect as the cellular phone according to the embodiment discussed above.

In the embodiment discussed above, the subject matter of the present disclosure is applied to a cellular phone. Besides the cellular phone, however, the subject matter of the present disclosure may be applied to various electronic devices such as a PHS (Personal Handyphone System) phone, a PDA (Personal Digital Assistant) device, a digital camera device, a digital video camera device, a portable gaming device, and a notebook personal computer device, for example. In any case, the same effect as the embodiment discussed above can be achieved.

Lastly, the embodiment discussed above is merely illustrative. Therefore, the present disclosure is not limited to the embodiment discussed above, and various modifications, combinations, and other embodiments may occur depending on design requirements and other factors insofar as they are within the scope of the appended claims or the equivalents thereof. This is to be understood by those skilled in the art as a matter of course.

The invention claimed is:

1. An electronic device comprising:
a housing including a frame member exposed to an outer surface of the electronic device;
a circuit substrate disposed within the housing on which a plurality of electronic components are disposed; and
a heat-radiating member provided in contact with or in close proximity to the electronic components disposed on the circuit substrate, and in contact with the frame member, wherein
the heat-radiating member includes
a heat-absorbing plate having a continuous top surface that extends beyond the electronic components disposed on the circuit substrate; and
a reinforcing plate having a continuous top surface that is in direct contact with, and extends beyond an outer periphery of, a continuous bottom surface of the heat-absorbing plate and a continuous bottom surface that is in direct contact with the frame member.

2. The electronic device of claim 1, wherein the heat-radiating member is in contact with the electronic components disposed on the circuit substrate.

3. The electronic device of claim 1, wherein the heat-radiating member is in close proximity to the electronic components disposed on the circuit substrate.

4. The electronic device of claim 1, wherein the heat-radiating member is formed of a high-conductivity material with high heat conductivity.

5. The electronic device of claim 1, wherein the frame member extends along an outer periphery of the housing.

6. The electronic device of claim 1, further comprising:
an upper housing and a lower housing disposed in contact with the frame member.

7. The electronic device of claim 1, wherein the heat-radiating member includes projections having shapes and volumes respectively corresponding to shapes and volumes of void portions formed between the electronic components and the heat-radiating member and between the circuit substrate and the heat-radiating member when the heat-radiating member is disposed to face the circuit substrate.

8. The electronic device of claim 7, wherein the projections are fitted with the void portions formed between the electronic components and the heat-radiating member and between the circuit substrate and the heat-radiating member when the heat-radiating member is disposed to face the circuit substrate.

9. The electronic device of claim 1, wherein the frame member includes one or a plurality of grooves formed on an outer surface facing the outer surface of the electronic device.

10. The electronic device of claim 1, wherein the frame member formed of aluminum.

11. The electronic device of claim 1, wherein the heat-radiating member is a copper plate or a silver plate.

12. A method of radiating heat from an electronic device comprising:
disposing a heat-radiating member in contact, or in close proximity, to electronic components on a circuit substrate disposed within a housing of the electronic device, and in contact with a frame member of the housing exposed to an outer surface of the electronic device, wherein
the heat-radiating member includes
a heat-absorbing plate having a continuous top surface that extends be and the electronic components disposed on the circuit substrate; and
a reinforcing plate having a continuous top surface that is in direct contact with, and extends beyond an outer periphery of, a continuous bottom surface of the heat-absorbing plate and a continuous bottom surface that is in direct contact with the frame member.

13. The method of claim 12, wherein the heat-radiating member includes projections having shapes and volumes respectively corresponding to shapes and volumes of void portions formed between the electronic components and the heat-radiating member and between the circuit substrate and the heat-radiating member when the heat-radiating member is disposed to face the circuit substrate.

14. The method of claim 13, wherein the projections are fitted with the void portions formed between the electronic components and the heat-radiating member and between the circuit substrate and the heat-radiating member when the heat-radiating member is disposed to face the circuit substrate.

\* \* \* \* \*